(12) United States Patent
Schneider et al.

(10) Patent No.: US 8,901,469 B2
(45) Date of Patent: Dec. 2, 2014

(54) METHOD AND APPARATUS FOR COOKING RAW FOOD ITEMS IN A MICROWAVE OVEN

(75) Inventors: Lee M. Schneider, Neenah, WI (US);
Terrence P. Lafferty, Neenah, WI (US);
Philip E. Netzer, Greenville, WI (US);
Patrick H. Wnek, Sherwood, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 959 days.

(21) Appl. No.: 12/371,709

(22) Filed: Feb. 16, 2009

(65) Prior Publication Data

US 2009/0206074 A1 Aug. 20, 2009

Related U.S. Application Data

(60) Provisional application No. 61/029,470, filed on Feb. 18, 2008, provisional application No. 61/050,365, filed on May 5, 2008.

(51) Int. Cl.
*H05B 6/80* (2006.01)
*H05B 6/76* (2006.01)
*H05B 6/64* (2006.01)
*A47J 36/02* (2006.01)
*B65D 81/34* (2006.01)

(52) U.S. Cl.
CPC ............ *H05B 6/6494* (2013.01); *A47J 36/027* (2013.01); *B65D 81/3453* (2013.01); *H05B 6/6408* (2013.01)
USPC .......................................... 219/730; 219/734

(58) Field of Classification Search
USPC ............ 219/728, 730, 733, 734, 735; 426/87, 426/234, 243, 107
See application file for complete search history.

(56) References Cited

U.S. PATENT DOCUMENTS

| | | | |
|---|---|---|---|
| 2,859,122 A | 11/1958 | Maturi et al. | |
| 3,965,323 A | 6/1976 | Forker, Jr. et al. | |
| 4,175,483 A * | 11/1979 | Clark | 99/354 |
| 4,606,496 A | 8/1986 | Marx et al. | |
| 4,609,140 A | 9/1986 | Van Handel et al. | |
| 4,721,499 A | 1/1988 | Marx et al. | |

(Continued)

FOREIGN PATENT DOCUMENTS

| | | |
|---|---|---|
| AU | 635667 B2 | 3/1993 |
| CA | 1279902 | 2/1991 |

(Continued)

OTHER PUBLICATIONS

International Search Report—PCT/US2009/034190.

(Continued)

*Primary Examiner* — Dana Ross
*Assistant Examiner* — Thomas Ward
(74) *Attorney, Agent, or Firm* — Womble Carlyle Sandridge & Rice, LLP

(57) ABSTRACT

An apparatus for preparing a food item in a microwave oven comprises a tray including an interior space defined by a base and an upstanding peripheral wall, and a cover pivotably connected to the tray for pivoting the cover relative to the tray between an open position and a closed position. The tray and/or cover includes a plurality of protrusions extending into the interior space. A microwave energy interactive material overlies the protrusions on the tray and/or cover.

34 Claims, 7 Drawing Sheets

(56) References Cited

U.S. PATENT DOCUMENTS

| | | | |
|---|---|---|---|
| 4,721,500 A | 1/1988 | Van Handel et al. | |
| 4,775,771 A | 10/1988 | Pawlowski | |
| 4,777,053 A | 10/1988 | Tobelmann et al. | |
| 4,794,005 A | 12/1988 | Swiontek | |
| 4,831,224 A | 5/1989 | Keefer | |
| 4,832,676 A | 5/1989 | Johns et al. | |
| 4,862,791 A | 9/1989 | Baughey | |
| 4,865,921 A | 9/1989 | Hollenberg | |
| 4,866,234 A | 9/1989 | Keefer | |
| 4,870,233 A | 9/1989 | McDonald et al. | |
| 4,888,459 A | 12/1989 | Keefer | |
| 4,890,439 A | 1/1990 | Smart | |
| 4,916,280 A | 4/1990 | Havette | |
| 4,936,935 A | 6/1990 | Beckett | |
| 4,963,424 A | 10/1990 | Beckett | |
| 5,026,958 A | 6/1991 | Palacios | |
| 5,093,364 A | 3/1992 | Richards | |
| 5,117,078 A | 5/1992 | Beckett | |
| 5,213,902 A | 5/1993 | Beckett | |
| 5,217,768 A | 6/1993 | Walters et al. | |
| 5,221,419 A | 6/1993 | Beckett | |
| 5,260,537 A | 11/1993 | Beckett | |
| 5,266,386 A | 11/1993 | Beckett | |
| 5,298,708 A * | 3/1994 | Babu et al. | 219/728 |
| 5,310,977 A | 5/1994 | Stenkamp et al. | |
| 5,310,980 A | 5/1994 | Beckett | |
| 5,317,118 A | 5/1994 | Brandberg et al. | |
| RE34,683 E | 8/1994 | Maynard | |
| 5,340,436 A | 8/1994 | Beckett | |
| 5,350,904 A | 9/1994 | Kemske et al. | |
| 5,354,973 A | 10/1994 | Beckett | |
| 5,410,135 A | 4/1995 | Pollart | |
| 5,424,517 A | 6/1995 | Habeger | |
| 5,519,195 A * | 5/1996 | Keefer et al. | 219/728 |
| 5,565,228 A | 10/1996 | Gics | |
| 5,585,027 A | 12/1996 | Young | |
| 5,628,921 A | 5/1997 | Beckett | |
| 5,672,407 A | 9/1997 | Beckett | |
| 5,698,127 A | 12/1997 | Lai et al. | |
| 5,759,422 A | 6/1998 | Schmelzer | |
| 5,800,724 A | 9/1998 | Habeger | |
| 6,114,679 A | 9/2000 | Lai | |
| 6,150,646 A | 11/2000 | Lai | |
| 6,150,647 A | 11/2000 | Anderson et al. | |
| 6,204,492 B1 | 3/2001 | Zeng et al. | |
| 6,251,451 B1 | 6/2001 | Zeng | |
| 6,414,290 B1 | 7/2002 | Cole | |
| 6,415,944 B1 | 7/2002 | Toussant | |
| 6,433,322 B2 | 8/2002 | Zeng et al. | |
| 6,455,827 B2 | 9/2002 | Zeng | |
| 6,463,844 B1 | 10/2002 | Wang et al. | |
| 6,501,059 B1 | 12/2002 | Mast | |
| 6,552,315 B2 | 4/2003 | Zeng et al. | |
| 6,608,292 B1 * | 8/2003 | Barnes | 219/730 |
| 6,639,199 B1 * | 10/2003 | Ross, Jr. | 219/735 |
| 6,651,874 B1 | 11/2003 | Pedersen | |
| 6,677,563 B2 | 1/2004 | Lai | |
| 6,717,121 B2 | 4/2004 | Zeng | |
| 6,765,182 B2 | 7/2004 | Cole | |
| 6,919,547 B2 | 7/2005 | Tsontzidis | |
| 6,988,654 B2 | 1/2006 | Wnek | |
| 7,019,271 B2 | 3/2006 | Wnek et al. | |
| 7,205,517 B2 | 4/2007 | Hoh | |
| 7,323,669 B2 | 1/2008 | Robison et al. | |
| 7,351,942 B2 | 4/2008 | Wnek et al. | |
| 7,365,292 B2 | 4/2008 | Cole et al. | |
| 7,476,830 B2 | 1/2009 | Middleton et al. | |
| 7,541,562 B2 | 6/2009 | Cole et al. | |
| 2001/0000732 A1 | 5/2001 | Hopkins, Sr. | |
| 2001/0021405 A1 | 9/2001 | Zeng | |
| 2003/0085224 A1 | 5/2003 | Tsontzidis et al. | |
| 2005/0205565 A1 | 9/2005 | Cole | |
| 2006/0011620 A1 | 1/2006 | Tsontzidis | |
| 2006/0113300 A1 | 6/2006 | Wnek | |
| 2007/0029316 A1 * | 2/2007 | Fernandez | 219/730 |
| 2007/0221666 A1 | 9/2007 | Keefe et al. | |
| 2008/0000896 A1 | 1/2008 | Lafferty et al. | |
| 2008/0081095 A1 | 4/2008 | Cole et al. | |
| 2008/0164178 A1 | 7/2008 | Wnek et al. | |
| 2009/0206075 A1 | 8/2009 | Lafferty | |
| 2010/0278990 A1 | 11/2010 | Wnek et al. | |

FOREIGN PATENT DOCUMENTS

| | | |
|---|---|---|
| DE | 79 03 283 U1 | 5/1979 |
| EP | 0 007 522 A1 | 2/1980 |
| EP | 0 246 041 A2 | 11/1987 |
| EP | 0 382 399 A2 | 8/1990 |
| GB | 2 407 153 A | 4/2005 |
| JP | S62-293020 | 12/1987 |
| JP | 07-033228 U | 6/1995 |
| JP | 2003-095332 | 4/2003 |
| JP | 2003-165582 A | 6/2003 |
| JP | 2007-312819 | 12/2007 |
| KR | 10-0436263 | 6/2004 |
| KR | 10-0436263 B1 | 6/2004 |
| KR | 10-0813904 B1 | 3/2008 |
| WO | WO 93/23971 A1 | 11/1993 |
| WO | WO 95/24110 A2 | 9/1995 |
| WO | WO 96/22228 A1 | 7/1996 |
| WO | WO 03/041451 A1 | 5/2003 |
| WO | WO 2004/020310 A1 | 3/2004 |
| WO | WO 2005/085091 A2 | 9/2005 |
| WO | WO 2007/133767 A2 | 11/2007 |
| WO | WO 2008/144343 A2 | 11/2008 |
| WO | WO 2009/105397 A2 | 8/2009 |
| WO | WO 2009/105398 A2 | 8/2009 |
| WO | WO 2010/127214 A2 | 11/2010 |

OTHER PUBLICATIONS

Written Opinion—PCT/US2009/034190.
Supplementary European Search Report for EP 08 75 5465, Feb. 22, 2011, Graphic Packaging International, Inc.
International Search Report—PCT/US2007/011615, May 15, 2007, Graphic Packaging International, Inc.
Written Opinion—PCT/US2007/011615, May 15, 2007, Graphic Packaging International, Inc.
International Search Report—PCT/US2008/063615, Dec. 5, 2008, Graphic Packaging International, Inc.
Written Opinion—PCT/US2008/063615, Dec. 5, 2008, Graphic Packaging International, Inc.
International Search Report—PCT/US2009/034191, Sep. 21, 2009, Graphic Packaging International, Inc.
Written Opinion—PCT/US2009/034191, Sep. 21, 2009, Graphic Packaging International, Inc.
International Search Report—PCT/US2010/033118, Jan. 28, 2011, Graphic Packaging International, Inc.
Written Opinion—PCT/US2010/033118, Jan. 28, 2011, Graphic Packaging International, Inc.
Notice of Allowance and Fee(s) Due dated Jul. 30, 2012 for U.S. Appl. No. 12/008,356.
Supplementary European Search Report for EP 09 71 1698 dated Mar. 28, 2013.
Notification of Reason for Refusal for JP 2012-100796 dated Jun. 20, 2013 with English translation.
Notice of Allowance and Fee(s) Due dated Oct. 9, 2013 for U.S. Appl. No. 12/378,574.

* cited by examiner

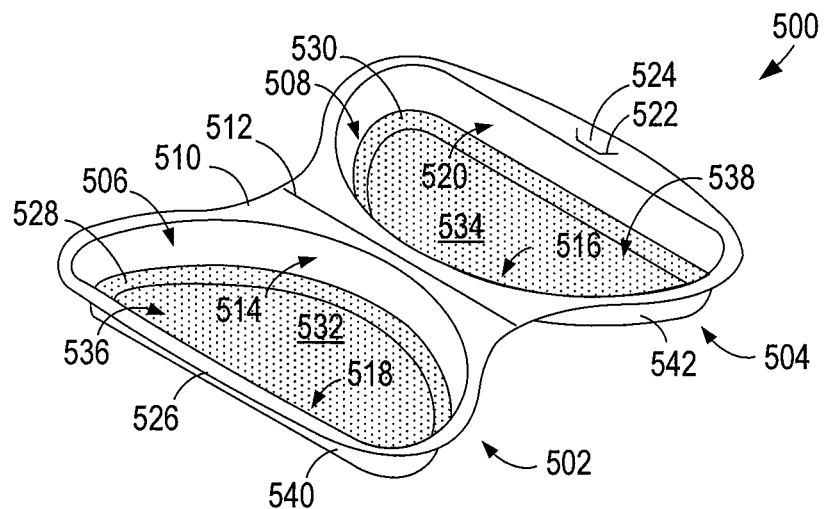
FIG. 5A
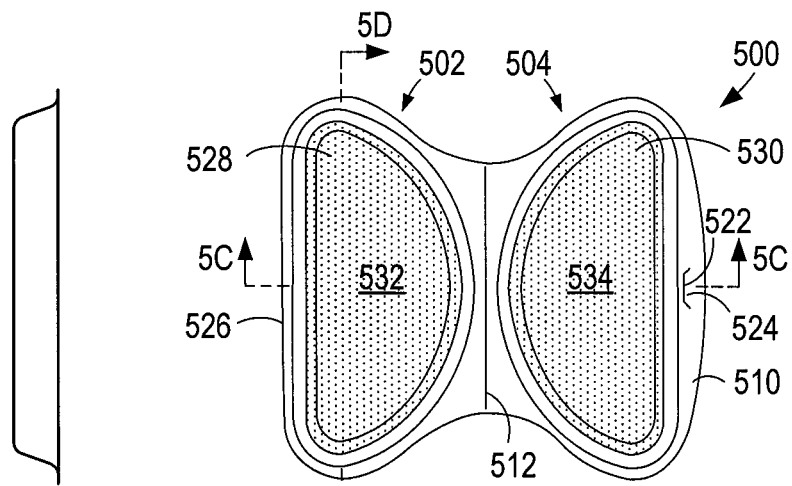
FIG. 5D
FIG. 5B
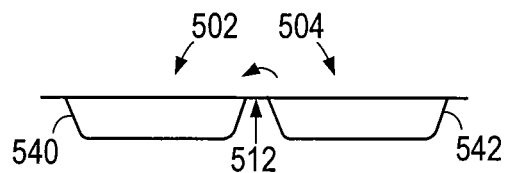
FIG. 5C

METHOD AND APPARATUS FOR COOKING RAW FOOD ITEMS IN A MICROWAVE OVEN

CROSS-REFERENCE TO RELATED APPLICATIONS

This application claims the benefit of U.S. Provisional Application No. 61/029,470, filed Feb. 18, 2008, and U.S. Provisional Application No. 61/050,365, filed May 5, 2008, both of which are incorporated by reference herein in their entirety.

TECHNICAL FIELD

Various constructs or apparatuses for heating or cooking a raw or uncooked food item in a microwave oven are disclosed.

BACKGROUND

Many packages are available for preparing food items in a microwave oven. However, many of such packages are intended for use with pre-cooked food items. Thus, there remains a need for a microwave heating apparatus for cooking food items in a raw or uncooked condition.

SUMMARY

This disclosure is directed generally to various apparatuses and methods for preparing a food item in a microwave oven. In particular, this disclosure is directed to apparatuses and methods of preparing a cooked food item from a raw or uncooked food product, for example, a food batter or other food product having a liquid or semi-liquid consistency. The apparatuses and methods may be used to prepare various food items, for example, waffles, omelets, French toast, scrambled eggs, pancakes, hash browns, bagels, cookies, cakes, sandwiches, muffins, scones, or any other food item in a microwave oven or a conventional oven. The apparatus may be formed at least partially from a disposable material, for example, paperboard.

The apparatus generally comprises a pair of opposed heating surfaces, plates, trays, or other constructs or structures that cooperate with one another to define an interior space for receiving an uncooked food item. If desired, one or both heating surfaces, plates, trays, or other constructs or structures may include one or more microwave energy interactive elements that alter the effect of microwave energy on an adjacent food item. In one example, the microwave interactive element comprises a thin layer of microwave energy interactive material (generally less than about 100 angstroms in thickness, for example, from about 60 to about 100 angstroms in thickness) that tends to absorb at least a portion of impinging microwave energy and convert it to thermal energy (i.e., heat) at the interface with the food item. Susceptor elements often are used to promote browning and/or crisping of the surface of a food item. However, other microwave energy interactive elements may be used. In some embodiments, the heating surfaces may heat, brown, and/or crisp multiple surfaces of the food item concurrently.

One or both of the opposed trays (or other structures) may be shaped and/or contoured to define an overall shape of the cooked food item, to define contours in the surface of food item, to accommodate the increasing volume of the food item as it cooks, and/or to provide ample space for the generation of steam within the interior space. The trays or other structures may be joined to one another and/or may include a locking mechanism to secure the plates in a superposed, substantially parallel relationship with one another.

One exemplary apparatus comprises a tray including an interior space defined by a base and an upstanding peripheral wall, and a cover pivotably connected to the tray for pivoting the cover relative to the tray between an open position and a closed position. The tray includes a plurality of projections or protrusions extending into the interior space. A microwave energy interactive material overlies the protrusions on the tray.

In one variation, the cover includes a plurality of protrusions extending into the interior space when the cover is in the closed position. The protrusions on the tray and cover may be in register or out of register with one another when the cover is in the closed position. In another variation, the cover includes a plurality of indentations extending away from the interior space when the cover is in the closed position. The protrusions on the tray and the indentations on the cover may be in register or out of with one another when the cover is in the closed position.

In this and other examples, the protrusions and indentations may have any suitable shape, and in some variations, the protrusions have a substantially frusto-conical shape, a substantially frusto-pyramidal shape, or a substantially hexahedral shape.

Another exemplary apparatus comprises a cavity for receiving an uncooked food item, a pair of opposed heating surfaces facing the cavity, and a microwave energy interactive material overlying the heating surfaces. The microwave energy interactive material may generally be operative for converting at least a portion of impinging microwave energy into thermal energy. Each of the heating surfaces may include a plurality of protrusions that extend into the cavity. The protrusions on the heating surfaces may be aligned with one another in a facing relationship within the cavity. Each heating surface also may include a substantially planar area between the protrusions. The cavity may have a peripheral wall adapted to at least partially define an overall shape of the food item.

One exemplary method comprises providing an apparatus for receiving an uncooked food item having an at least partially liquid consistency, and exposing the uncooked food item within the apparatus to microwave energy. The apparatus includes a plurality of projections that extend into the uncooked food item. The projections include a microwave energy interactive material operative for converting at least a portion of impinging microwave energy into thermal energy. Upon sufficient exposure to microwave energy, the microwave energy interactive material generates thermal energy and transforms the uncooked food item into a cooked food item having an at least partially solid consistency. The cooked food item has a surface including a plurality of indentations at least partially defined by the projections of the apparatus.

In one variation, the apparatus includes a pair of heating surfaces, at least one of the heating surfaces being at least partially defined by the projections, and the method further comprises securing the heating surfaces in a substantially opposed, facing relationship with one another.

Another exemplary method of preparing a shaped food item comprises providing an apparatus for receiving an uncooked food item having an at least partially liquid consistency, where the apparatus includes a pair of trays, placing the uncooked item into one of the trays, and exposing the uncooked food item within the apparatus to microwave energy. Each tray includes an interior space defined by a base and an upstanding peripheral wall. Each interior space has a respective volume (or tray volume). The pair of trays may be hingedly joined to one another with their respective interior spaces facing one another. A microwave energy interactive material may overlie the base of at least one tray on a side of the respective tray facing the interior space of the respective tray. The uncooked food item has a volume no greater than the volume of the tray into which the uncooked food item is placed. Upon sufficient exposure to microwave energy, the microwave energy interactive material generates thermal energy and transforms the uncooked food item into a cooked food item having an at least partially solid consistency. The cooked food item has a volume no greater than a sum of the respective tray volumes, and a shape defined by the base and peripheral wall of at least one of the trays. The volume of the cooked food may be approximately equal to the volume of the uncooked food item, or may be greater than the volume of the uncooked food item. In one variation, the method further comprises inverting the apparatus such that the uncooked food item transfers from one tray to the other, and optionally further exposing the food item microwave energy.

Additional aspects, features, and advantages of the present invention will become apparent from the following description and accompanying figures.

BRIEF DESCRIPTION OF THE DRAWINGS

The description refers to the accompanying drawings in which like reference characters refer to like parts throughout the several views, and in which:

FIG. 5A is a schematic perspective view of a fifth embodiment of a microwave heating apparatus, in a fully open configuration;

FIG. 5B is a schematic top plan view of the microwave heating apparatus of FIG. 5A;

FIG. 5C is a schematic cross-sectional view of the microwave heating apparatus of FIG. 5B, taken along a line 5C-5C;

FIG. 5D is a schematic cross-sectional view of the microwave heating apparatus of FIG. 5B, taken along a line 5D-5D;

DESCRIPTION

The present invention may be illustrated further by referring to the figures. For purposes of simplicity, like numerals may be used to describe like features. It will be understood that where a plurality of similar features are depicted, not all of such features necessarily are labeled on each figure. It also will be understood that various components used to form the apparatuses of the present invention may be interchanged. Thus, while only certain combinations are illustrated herein, numerous other combinations and configurations are contemplated hereby.

Figure 1A:
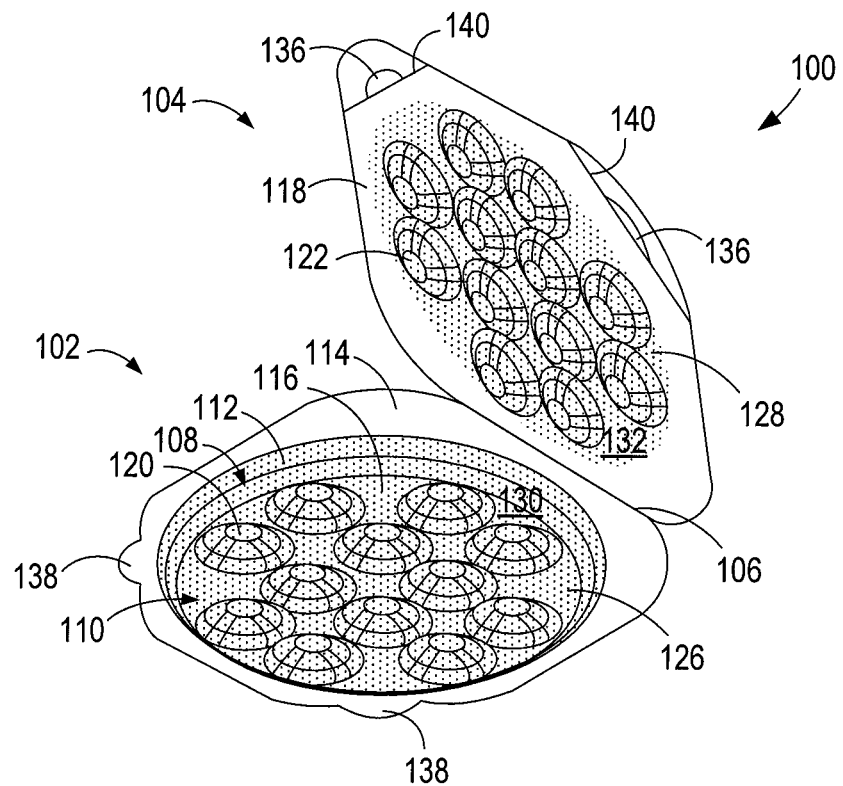
FIG. 1A is a schematic perspective view of a first embodiment of a microwave heating apparatus, in a partially open configuration.

FIGS. 1A-1F schematically depict a microwave heating apparatus 100 (i.e., a microwave energy interactive heating apparatus) for preparing a food item, for example, a waffle, pizelle, or other textured cake-like product (not shown). As shown in FIG. 1A, the apparatus 100 generally includes a tray 102 and a cover 104 foldably joined to one another along a line of disruption (e.g., a score line, fold line, cut-crease line, perforation line, or the like), for example, a fold line 106, such that the cover 104 can be pivoted between an open position and a closed position relative to the tray 102. However, the tray 102 and cover 104 may be separate from one another (i.e., not connected to one another alone fold line 106) in other embodiments, or may be connected to one another in some other suitable manner.

The tray 102 includes an interior space or cavity 108 defined by a base 110 and an upstanding peripheral wall 112. The cavity 108 may be dimensioned to receive a suitable quantity of uncooked food batter (not shown), which may have a liquid or semi-liquid consistency, and may be shaped as needed to at least partially define an overall shape of the resulting food item. All or a portion of the wall 112 may have a sloped profile (FIG. 1D), an upright profile, or any other suitable profile. A rim or flange 114 extends around the uppermost edge of the wall 112.

The base 110 of the tray 102 and the cover 104 each include a respective substantially planar portion 116, 118 and a respective plurality of projections or protrusions 120, 122 extending out of the plane of the planar portion 116, 118, such that the planar portion 116, 118 of the base 110 and cover 104 generally extends around and between the respective protrusions 120, 122. In this example, the protrusions 120, 122 are generally frusto-pyramidal in shape, that is, the protrusions generally resemble a pyramid that has been truncated by a plane that is substantially parallel to the base of the pyramid. However, other shapes are contemplated by the disclosure. By way of example, and not limitation, the protrusions may have any suitable shape, and in some variations, the protrusions have a substantially frusto-conical shape or a substantially hexahedral shape, for example, a cubical shape.

Figure 1B:
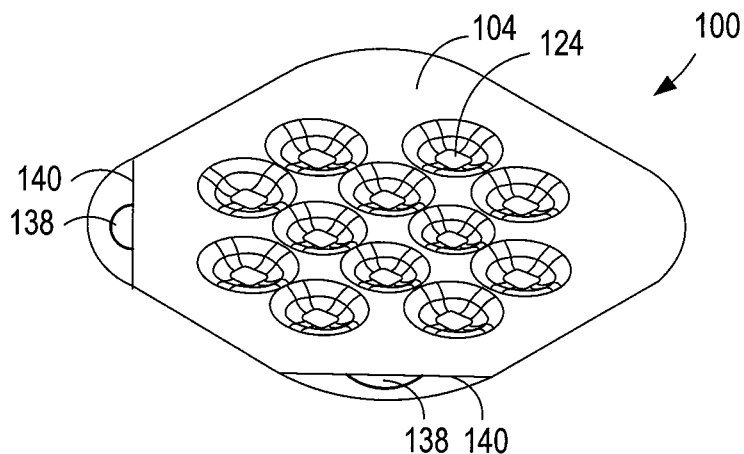
FIG. 1B is a schematic perspective view of the microwave heating apparatus of FIG. 1A, in a closed configuration.
Figure 1C:
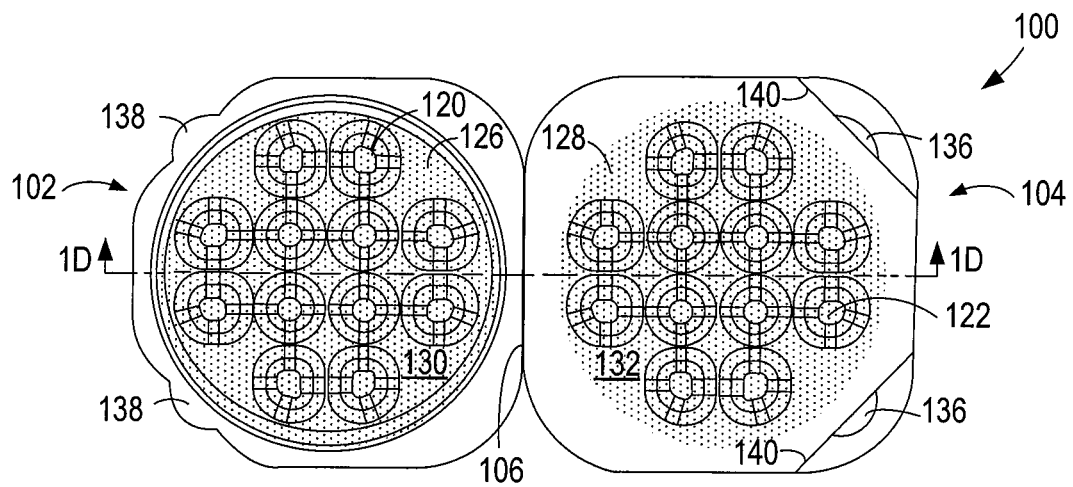
FIG. 1C is a schematic top plan view of the microwave heating apparatus of FIG. 1A, in a fully open configuration.
Figure 1D:
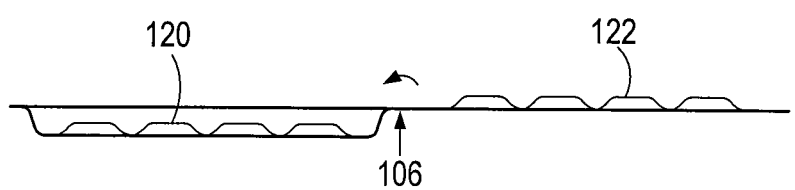
FIG. 1D is a schematic cross-sectional view of the microwave heating apparatus of FIG. 1C, taken along a line 1D-1D.
Figure 1E:
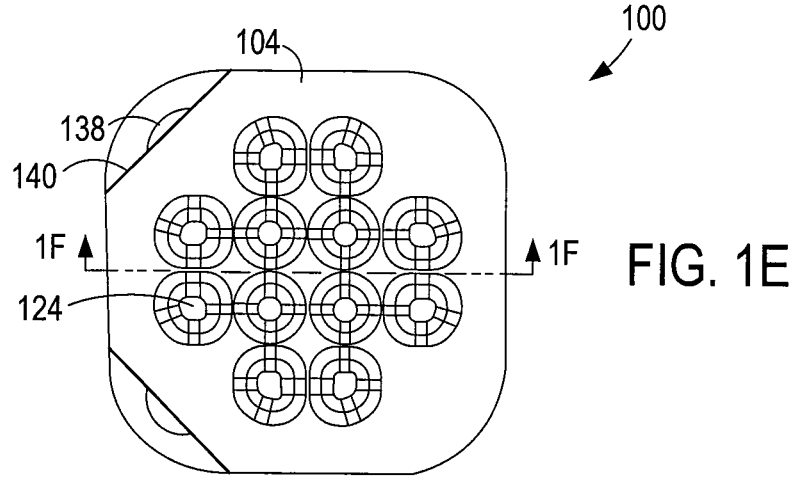
FIG. 1E is a schematic top plan view of the microwave heating apparatus of FIG. 1A, in a closed configuration.
Figure 1F:
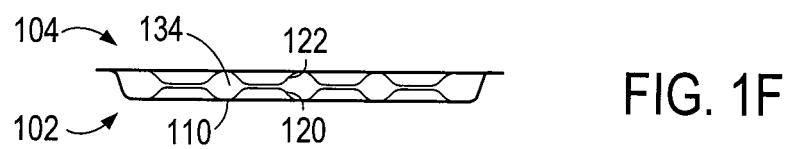
FIG. 1F is a schematic cross-sectional view of the microwave heating apparatus of FIG. 1E, taken along a line 1F-1F.

When the apparatus 100 is in a closed configuration (FIGS. 1B and 1E), that is, when the peripheral planar portion 118 of the cover 104 is brought into contact with the rim 114 of the tray 102, the protrusions 120 on the tray 102 extend upwardly towards the cover 104 and the protrusions 122 on the cover 104 extend downwardly towards the tray 102, as shown in FIG. 1F. In this example, the respective protrusions 120, 122 are configured to be in register with one another when the cover 104 is in the closed position, as shown in FIG. 1F. However, in other embodiments, the protrusions may be out of register with one another. Numerous other arrangements of protrusions may be used.

Further, in this example, the exterior side of the cover 104 includes a plurality of indentations 124 corresponding to the protrusions 122 on the interior side of the cover 104, as shown in FIG. 1B (showing the indentations 124 on the cover 104 only). The tray 102 may similarly include a plurality of indentations (not shown) on an exterior side of the base 110 opposite the protrusions 120. In such an embodiment, the tray 102 and cover 104 each may be formed using a thermal, mechanical, or thermomechanical pressing technique. However, it is contemplated that the cover 104 and the base 110 of the tray 102 may be substantially planar and/or may be provided with projections or protrusions in some other suitable manner.

If desired, one or more microwave energy interactive elements 126, 128 (shown schematically with stippling in FIGS. 1A and 1C and throughout the drawings), for example, susceptors, may overlie and/or define at least a portion of a respective interior surface 130, 132 of the tray 102 and cover 104, including respective protrusions 120, 122. The susceptors 126, 128 may be positioned on a portion of the interior side of the base 110, wall 112, and/or cover 104 intended to be in contact with the food item (in an uncooked and/or cooked condition) to define respective heating surfaces. Other microwave energy interactive elements may be used, as will be discussed further below.

To use the apparatus 100 according to one acceptable method, a quantity of food batter having an at least partially liquid consistency (such that the batter flows) may be placed into the cavity 108 and the apparatus 100 may be closed, such that the protrusions 122 on the cover 104 become at least partially submerged in, and at least partially displace, the batter in the cavity 108. In this closed configuration, the interior space 134 (FIG. 1F) of the apparatus 100 is collectively defined by the peripheral wall 112, the base 110 of the tray 102, and the cover 104, including the respective protrusions 120, 122 on the tray 102 and cover 104.

If desired, the apparatus 100 may include a locking mechanism to secure the cover 104 in a closed, superposed relationship with the tray 102. In this example, as shown in FIGS. 1A and 1C, the locking mechanism includes a pair of cutouts 136 adapted to respectively engage a pair of locking projections 138 on the cover 104. If desired, a line of disruption, for example, a fold line 140, may be provided in the tray 102 adjacent to each respective cutout 136 to facilitate insertion of the locking projection 138 into the respective cutout 136.

When exposed to microwave energy, the susceptors 126, 128 overlying and/or defining the respective interior surfaces 130, 132 of the tray 102 and cover 104 convert at least a portion of the microwave energy into thermal energy (i.e., sensible heat). The heat then may be transferred to the batter to transform the uncooked batter into a cooked food item having an at least partially solid consistency, for example, a waffle. The heat also may assist with browning and/or crisping the surface of the food item.

As the batter cooks, the food item may expand and generally take the shape of the interior space 134 of the apparatus 100, with the various protrusions 120, 122 defining a pattern of indentations on opposite sides of the food item. The protrusions may be spaced, sized, and shaped in any suitable manner to create any desired pattern of indentations on the food item. When the heating cycle is complete, the food item may be removed from the interior space 134 and the apparatus 100 may be discarded.

FIGS. 2A-4F schematically depict several exemplary variations of the microwave heating apparatus 100 of FIGS. 1A-1F. The various apparatuses 200, 300, 400 include features that are similar to the apparatus 100 shown in FIGS. 1A-1F, except for variations noted and variations that will be understood by those of skill in the art. For simplicity, the reference numerals of similar features are preceded in the figures with a "2" (FIGS. 2A and 2B), "3" (FIGS. 3A and 3B), or "4" (FIGS. 4A-4F) instead of a "1".

Figure 2A:
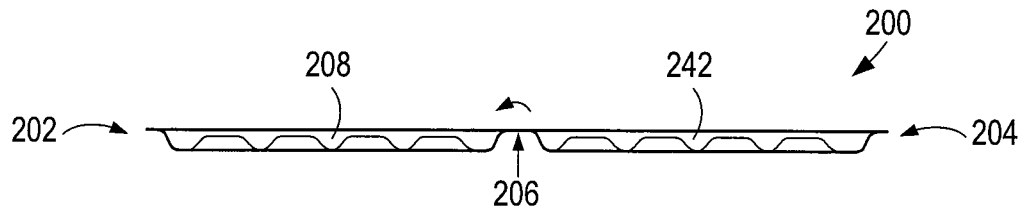
FIG. 2A is a schematic cross-sectional view of a second embodiment of a microwave heating apparatus, in a fully open configuration.
Figure 2B:
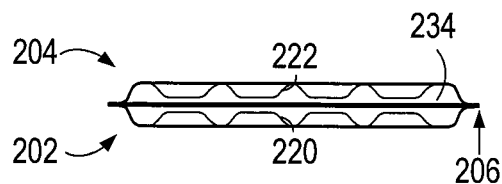
FIG. 2B is a schematic cross-sectional view of the microwave heating apparatus of FIG. 2A, in a closed configuration.

In the apparatus 200 schematically illustrated in FIGS. 2A and 2B, the cover 204 includes a cavity 242, such that when the cover 204 is in the closed position relative to the tray 202 (FIG. 2B), the interior space 234 of the apparatus 200 is collectively defined by the cavities 208, 242 in the tray 202 and cover 204. Such an apparatus 200 may be appropriate for use, for example, when the quantity of batter to be used can be contained in the tray 202 and the food item is expected to expand in volume into the cavity 242 of the cover 204. In this and other embodiments, the user may be instructed to invert the apparatus during heating to ensure even heating, browning, and/or crisping of the resulting food item.

Figure 3A:
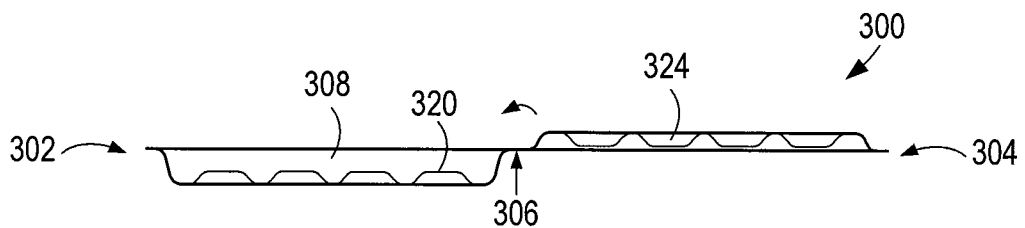
FIG. 3A is a schematic cross-sectional view of a third embodiment of a microwave heating apparatus, in a fully open configuration.
Figure 3B:
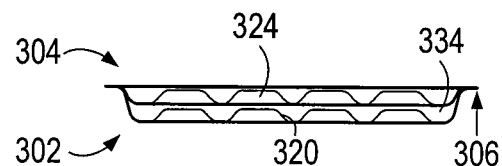
FIG. 3B is a schematic cross-sectional view of the microwave heating apparatus of FIG. 3A, in a closed configuration.
Figure 4A:
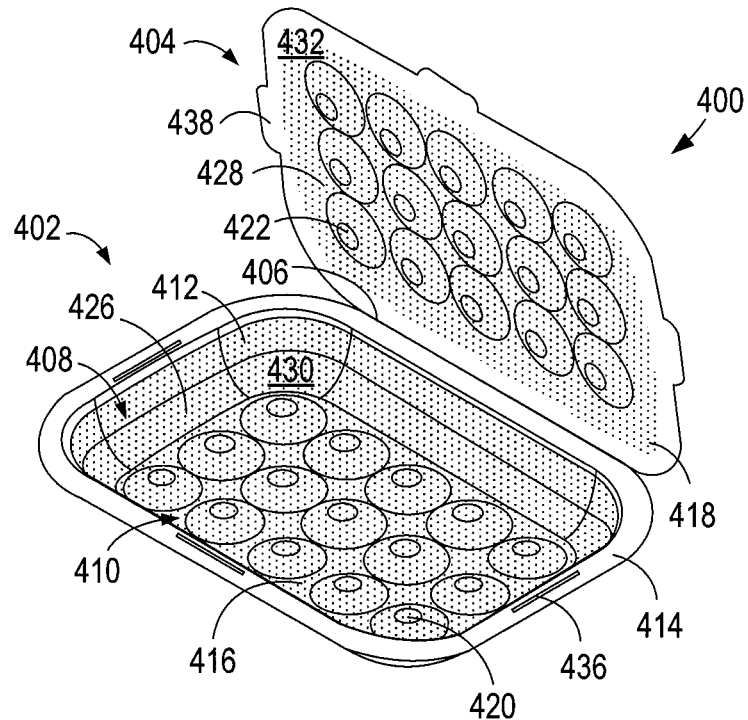
FIG. 4A is a schematic perspective view of a fourth embodiment of a microwave heating apparatus, in a partially open configuration.
Figure 4B:
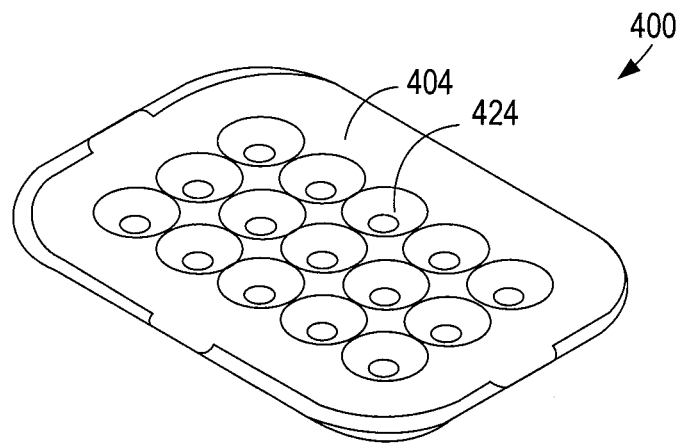
FIG. 4B is a schematic perspective view of the microwave heating apparatus of FIG. 4A, in a closed, unlocked configuration.
Figure 4C:
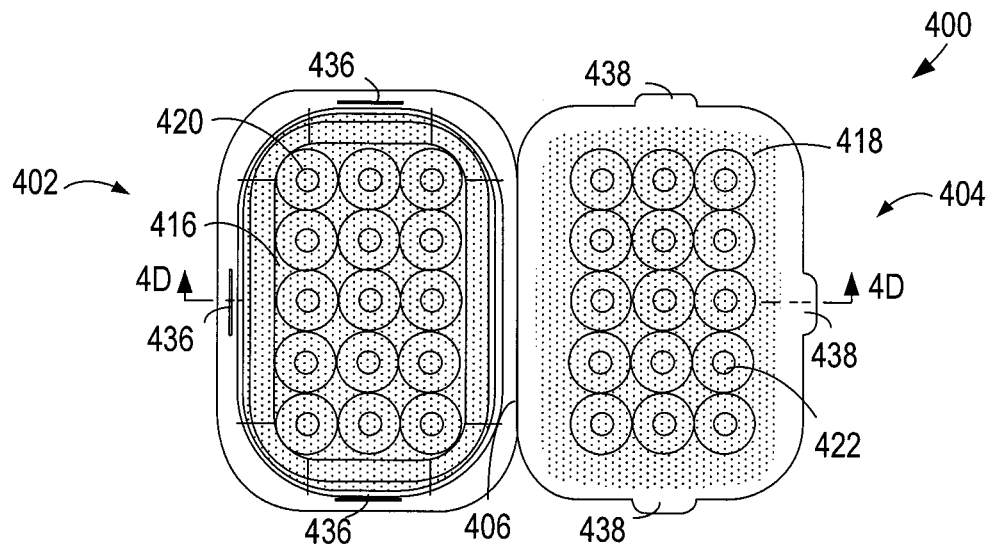
FIG. 4C is a schematic top plan view of the microwave heating apparatus of FIG. 4A, in a fully open configuration.
Figure 4D:
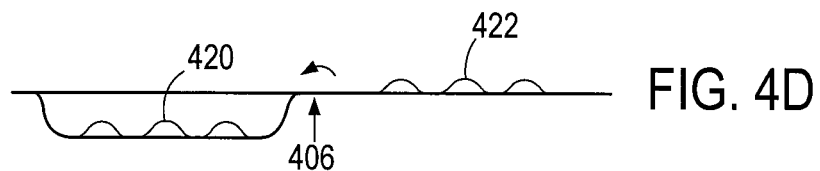
FIG. 4D is a schematic cross-sectional view of the microwave heating apparatus of FIG. 4C, taken along a line 4D-4D.
Figure 4E:
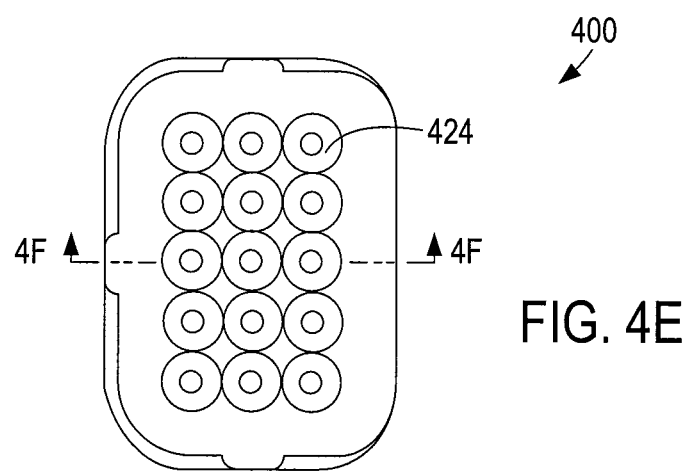
FIG. 4E is a schematic top plan view of the microwave heating apparatus of FIG. 4A, in a closed, unlocked configuration.
Figure 4F:
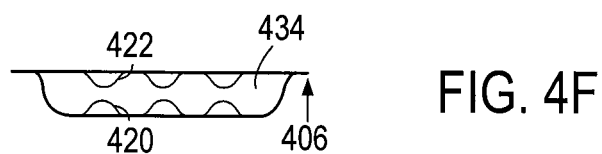
FIG. 4F is a schematic cross-sectional view of the microwave heating apparatus of FIG. 4E, taken along a line 4F-4F.

In another exemplary apparatus shown schematically in FIGS. 3A and 3B, the cover 304 includes a plurality of indentations 324 on the interior side of the cover 304, such that when the cover 304 is in the closed position (FIG. 3B), the indentations 324 extend away from the interior space 334 of the apparatus 300. In this example, the indentations 324 in the cover 304 are in register with the protrusions 320 in the tray 302. However, other arrangements are contemplated. When the apparatus 300 is closed, the batter in the cavity 308 of the tray 302 is forced into and/or expands into the indentations 324 in the cover 304, thereby forming wave-like contours in the resulting food item.

FIGS. 4A-4F schematically illustrate yet another variation of the apparatus 100 of FIGS. 1A-1F. In this example, the apparatus 400 has a generally rectangular shape. The protrusions are generally frusto-conical in shape, that is, the protrusions generally resemble a cone that has been truncated by a plane that is substantially parallel to the base of the cone. Further, the cover 404 includes three locking projections 438 adapted to engage respective corresponding receiving slots 436 to maintain the apparatus 400 in a closed position.

While the examples of FIGS. 1A-4F are adapted to form a textured or contoured food item, other apparatuses may be used to form other types of food items. If desired, the dimensions of the protrusions may be reduced, or the protrusions may be eliminated, to form an apparatus for preparing a less textured or smoother item, for example, an omelet, pancake, french toast, hash browns, eggs, cookie, and so on.

For example, FIGS. 5A-5D schematically depict another exemplary microwave heating apparatus 500 for preparing a food item, for example, an omelet, pancake, or other shaped food item (not shown). The apparatus 500 includes a pair of trays 502, 504 (or a tray 502 and a cover 504), each having a respective cavity 506, 508 capable of receiving raw food product, for example, raw egg product or batter, which may have a liquid or semi-liquid consistency. A substantially planar rim or flange 510 extends around and between the trays 502, 504 and maintains the trays 502, 504 in a desired position with respect to one another. A line of disruption 512 (e.g., a score line, fold line, cut-crease line, perforation line, or the like) in the flange 510 between the trays 502, 504 enables the trays 502, 504 to hinge towards one another.

Each tray 502, 504 and corresponding cavity 506, 508 has a substantially semi-circular shape, generally resembling a desired shape for a conventional omelet. The trays 502, 504 each include a respective substantially arcuate portion 514, 516 and a substantially linear portion 518, 520. In this example, trays 502, 504 are oriented with the respective arcuate portions 514, 516 facing one another along the line of disruption or hinge 512, such that the apparatus 500 has an overall shape that generally resembles an hourglass. However, other configurations are contemplated.

To use the apparatus 500 according to one acceptable method, a quantity of raw food product, for example, raw egg product (not shown), may be placed into one of the cavities, for example, cavity 506, and the apparatus 500 may be closed by hinging tray 504 along line of disruption 512 until the trays 502, 504 are superposed with one another. In this closed configuration, one tray serves as a holder for the food item, while the other tray serves as a cover or lid for the food-containing tray. For example, when tray 502 serves as the food-containing tray, tray 504 serves as a cover or lid for tray 502. Conversely, when tray 504 serves as the food-containing tray, tray 502 serves as the cover or lid for tray 504.

If desired, the apparatus 500 may include a locking mechanism to secure the trays 502, 504 in the closed position. In this example, the apparatus 500 includes a slit 522 within the flange 510 that defines a locking flap 524 adjacent to the cavity 508. The locking flap 524 is adapted to engage the edge 526 of the opposed tray 502 to secure the trays 502, 504 in a locked configuration. However, numerous other locking features may be used.

The raw egg product may be heated within the cavity 506 for a specified amount of time, after which the user may be instructed to invert the apparatus 500. In doing so, the partially cooked egg product may be transferred from one cavity to the other, for example, from cavity 506 to cavity 508, to provide more even heating of the food item. When the heating cycle is complete, the cooked food item, for example, the omelet, may be removed from the cavity 508 and the apparatus 500 may be discarded.

According to an alternative method, the food item may be heated solely in one cavity 506, 508 or the other without inverting the apparatus 500 during the heating cycle. In this method and others, the unoccupied portion of the interior space of the apparatus (i.e., the unoccupied portion of the combined volume of the cavities) may accommodate the expanding volume of the food item and/or may allow the accumulation of steam to assist with heating of the food item. In such methods, the combined volume of the cavities 506, 508 (i.e., the sum of the individual cavity or tray volumes) will generally be greater than the expected and/or desired volume of the cooked food item. One or more venting apertures may be provided where needed to release a portion of the steam so the food item may achieve the desired height and/or moisture content.

If desired, the apparatus 500 may include one or more microwave energy interactive elements that alter the effect of microwave energy on the food item. For example, where additional heating, and/or browning and/or crisping, is desired, one or more susceptors 528, 530 (shown schematically with stippling in FIGS. 5A and 5B) may overlie and/or define at least a portion of a respective interior surface 532, 534 of one or both trays 502, 504. In this example, the susceptors 528, 530 generally overlie the interior side of the respective base 536, 538 of each tray 502, 504. However, the susceptors 528, 530 could additionally or alternatively overlie at least a portion of interior side the respective peripheral wall 540, 542, and/or any other part of the apparatus 500. It will be understood that all or a portion of the walls 540, 542 may have a sloped profile, an upright profile, or any other suitable profile to provide the desired contact area for heating, browning and/or crisping, and/or to attain the desired overall shape of the cooked food item.

When exposed to microwave energy, the susceptor elements 528, 530 convert at least a portion of the microwave energy into sensible heat, which then may be transferred to the uncooked food item to assist with transforming the uncooked food item having an at least partially liquid consistency into a cooked food item having an at least partially solid consistency. The heat also may assist with browning and/or crisping the surface of the resulting food item in the cavity in which the food item is heated. If the apparatus 500 is inverted during heating, the opposite surface of the food item also may be heated, browned, and/or crisped. Other microwave energy interactive elements may be used alternatively or additionally, as will be discussed further below.

Figure 6A:
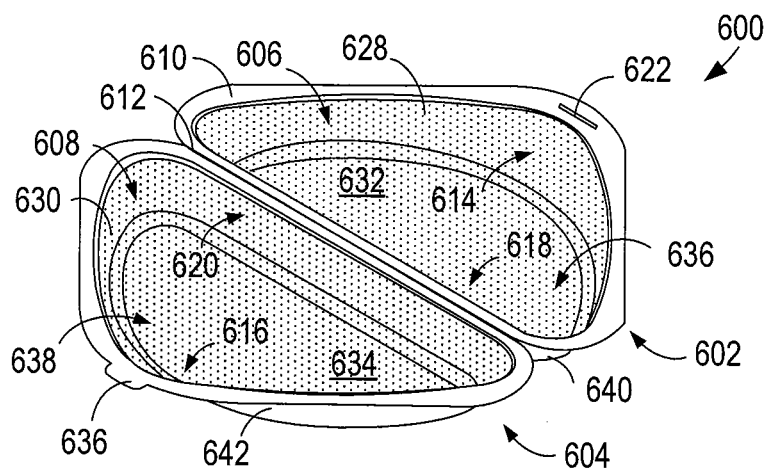
FIG. 6A is a schematic perspective view of a sixth embodiment of a microwave heating apparatus, in a fully open configuration.
Figure 6B:
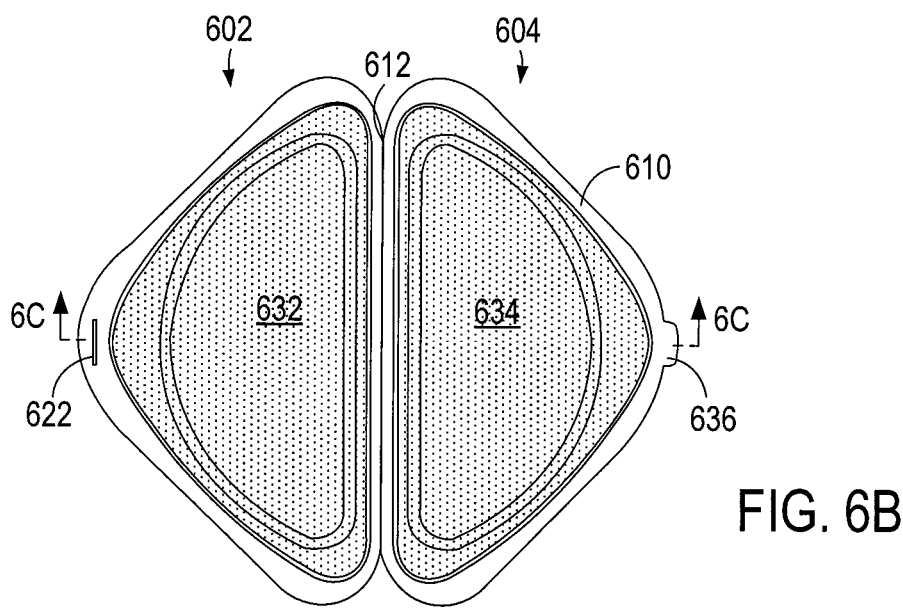
FIG. 6B is a schematic top plan view of the microwave heating apparatus of FIG. 6A.
Figure 6C:
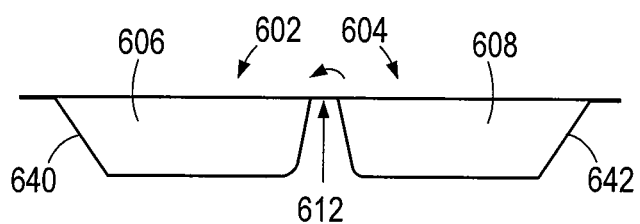
FIG. 6C is a schematic cross-sectional view of the microwave heating apparatus of FIG. 6B, taken along a line 6C-6C.

FIGS. 6A-6C schematically depict an exemplary variation of the apparatus 500 of FIGS. 5A-5D. The apparatus 600 includes features that are similar to apparatus 500 shown in FIGS. 5A-5D, except for variations noted and variations that will be understood by those of skill in the art. For simplicity, the reference numerals of similar features are preceded in the figures with a "6" instead of a "5".

In this example, the trays 602, 604 are oriented with the respective linear portions 618, 620 facing one another along the line of disruption or hinge 612, such that each tray 602, 604 has a generally triangular shape. The locking mechanism includes a locking tab 636 disposed along an edge of tray 602 that engages a slit 622 in the rim 610 of tray 604. Further, the susceptors 628, 630 overlie the interior side of the base 636, 638 and respective peripheral wall 640, 642 of each tray 602, 604. Such an apparatus 600 may be suitable for use, for example, with a food item intended to have a greater height and a surface that is desirably browned and/or crisped, for example, a scone or cake.

Numerous other microwave heating apparatuses, constructs, and structures are encompassed by the disclosure. Any of such apparatuses have any suitable dimensions, depending on the type of food item being heated, the desired heating time, the desired degree of browning and/or crisping, or any other suitable criteria.

Any of such apparatuses may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the apparatus.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors are illustrated herein, the apparatus alternatively or additionally may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where the food item is prone to scorching or drying out during heating. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and U.S. Pat. No. 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture". A non-physical aperture is a microwave energy transparent area that allows microwave energy to pass through the structure without an actual void or hole cut through the structure. Such areas may be formed by simply not applying a microwave energy interactive material to the particular area, or by removing microwave energy interactive material in the particular area, or by chemically and/or mechanically deactivating the microwave energy interactive material in the particular area. While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance browning and/or crisping.

In some instances, it may be beneficial to create one or more discontinuities or inactive regions to prevent overheating or charring of the apparatus. By way of example, and not limitation, in the construct 100 illustrated in FIGS. 1A-1F, the peripheral planar portion 118 of the cover 104 is in an overlapping relationship with the rim 114 of the tray 102. When exposed to microwave energy, the concentration of heat generated by the overlapping areas may be sufficient to cause the underlying support, in this case, paperboard, to become scorched. As such, the overlapping portions of the cover 104 and tray 102 may be designed to be microwave energy transparent (as shown), for example, by forming these areas of the apparatus 100 without a microwave energy interactive material, by removing any microwave energy interactive material that has been applied, or by deactivating the microwave energy interactive material in these areas.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. This may be achieved using any suitable technique, such as those described above.

If desired, the microwave energy interactive element may be supported on a microwave inactive or transparent substrate, for example, a polymer film or other suitable polymeric material, for ease of handling and/or to prevent contact between the microwave energy interactive material and the food item. Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Various materials may serve as the base material for the apparatus. For example, the apparatus may be formed at least partially from a polymer or polymeric material. As another example, all or a portion the apparatus may be formed from a paper or paperboard material. In one example, the paper has a basis weight of from about 15 to about 60 lbs/ream (lb/3000 sq. ft.), for example, from about 20 to about 40 lbs/ream. In another example, the paper has a basis weight of about 25 lbs/ream. In another example, the paperboard having a basis weight of from about 60 to about 330 lbs/ream, for example, from about 155 to about 265 lbs/ream. In one particular example, the paperboard has a basis weight of about 175 lbs/ream. The paperboard generally may have a thickness of from about 6 to about 30 mils, for example, from about 14 to about 24 mils. In one particular example, the paperboard has a thickness of about 16 mils. Any suitable paperboard may be used, for example, a solid bleached or solid unbleached sulfate board, such as SUS® board, commercially available from Graphic Packaging International.

The apparatus may be formed according to numerous processes known to those in the art, including using adhesive bonding, thermal bonding, ultrasonic bonding, mechanical stitching, or any other suitable process. Any of the various components used to form the apparatus may be provided as a sheet of material, a roll of material, or a die cut material in the shape of the apparatus to be formed (e.g., a blank).

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave heating apparatus, comprising:
    a tray and a cover hingedly joined to one another, wherein the tray and cover each comprise a susceptor film joined to paperboard, the susceptor film comprising a polymer film and a layer of microwave energy interactive material having a thickness of from about 60 to about 100 angstroms so that the layer of microwave energy interactive material is operative for absorbing microwave energy and generating heat, wherein the polymer film at least partially defines an interior surface of the tray and cover, so that the microwave energy interactive material is for being closely proximate to a food item within the apparatus,
    wherein the tray and cover each include
        a plurality of protrusions on an interior side of the tray and cover, and
        a plurality of indentations on an exterior side of the tray and cover, wherein the indentations on the exterior side of the tray and cover define the respective protrusions on the interior side of the tray and cover, and
    wherein for each protrusion of at least some protrusions of the plurality of protrusions:
        the indentation that defines the protrusion also defines a cavity
        the protrusion comprises a base end, an end opposite the base end, and a lateral surface extending completely around the cavity, the lateral surface extending from the base end of the protrusion to the opposite end of the protrusion,
        a portion of the susceptor film extends substantially continuously both around the protrusion and from the base end of the protrusion to the opposite end of the protrusion, comprising the lateral surface as a whole being substantially continuously covered by the portion of the susceptor film, so that the portion of the susceptor film extends substantially continuously around the cavity, and
        the portion of the susceptor film comprises both
            a portion of the polymer film and
            a portion of the layer of microwave energy interactive material having a thickness of from about 60 to about 100 angstroms.

2. The apparatus of claim 1, wherein the protrusions are substantially frusto-conical or substantially frusto-pyramidal in shape, and the portions of the susceptor film are substantially frusto-conical or substantially frusto-pyramidal in shape.

3. The apparatus of claim 1, wherein the microwave energy interactive material comprises at least one of aluminum and indium tin oxide.

4. The apparatus of claim 1, formed by a method comprising subjecting the susceptor film joined to paperboard to a thermal, mechanical, or thermomechanical pressing technique.

5. The apparatus of claim 1, in combination with the food item, wherein the food item is initially in an uncooked state.

6. A method of using the combination of claim 5, comprising exposing the uncooked food item within the apparatus to microwave energy, so that the microwave energy interactive material generates heat to cook the uncooked food item.

7. A microwave heating apparatus, comprising:
    a tray and a cover connected to one another, the cover being operative for pivoting relative to the tray between an open position and a closed position, the closed position defining an interior space for receiving a food item, wherein the tray and cover each comprise a susceptor film joined to paperboard, the susceptor film comprising a polymer film and a layer of aluminum operative for absorbing microwave energy and generating heat, wherein the polymer film faces the interior space when the cover is in the closed position, so that the layer of aluminum is closely proximate to the interior space for heating the food item, wherein the tray and cover each include
    a plurality of protrusions on an interior side of the tray and cover, wherein the plurality of protrusions extend towards the interior space when the cover is in the closed position, and
    a plurality of indentations on an exterior side of the tray and cover, wherein the indentations on the exterior side of the tray and cover define the respective protrusions on the interior side of the tray and cover, and
wherein for each protrusion of at least some protrusions of the plurality of protrusions:
    the indentation that defines the protrusion also defines a cavity
    the protrusion comprises a base end, an end opposite the base end, and a lateral surface extending completely around the cavity, the lateral surface extending from the base end of the protrusion to the opposite end of the protrusion,
    a portion of the susceptor film extends substantially continuously both around the protrusion and from the base end of the protrusion to the opposite end of the protrusion, comprising the lateral surface as a whole being substantially continuously covered by the portion of the susceptor film, so that the portion of the susceptor film extends substantially continuously around the cavity, and
    the portion of the susceptor film comprises both
        a portion of the polymer film and
        a portion of the layer of microwave energy interactive material.

8. The apparatus of claim 7, wherein the protrusions are substantially frusto-conical or substantially frusto-pyramidal in shape, and the portions of the susceptor film are substantially frusto-conical or substantially frusto-pyramidal in shape.

9. The apparatus of claim 7, wherein the layer of aluminum has a thickness of from about 60 to about 100 angstroms.

10. The apparatus of claim 7, formed by a method comprising subjecting the susceptor film joined to paperboard to a thermal, mechanical, or thermomechanical pressing process.

11. The apparatus of claim 7, in combination with the food item, wherein the food item initially has an at least partially liquid consistency.

12. A method of using the combination of claim 11, comprising exposing the food item within the apparatus to microwave energy, so that the microwave energy interactive material generates heat that cooks the food item, wherein the cooked food item has an at least partially solid consistency.

13. A microwave heating apparatus, comprising:
a tray and a cover connected to one another, the tray and cover each comprising a susceptor film joined to paperboard, wherein the susceptor film comprises a layer of microwave energy interactive material operative for absorbing microwave energy and generating heat,
wherein
    an interior side of the tray includes a plurality of protrusions that extend towards the interior space when the cover is in the closed position,
    an exterior side of the tray includes a plurality of indentations aligned with the protrusions on the interior side of the tray,
    an interior side of the cover includes a plurality of indentations that extend away from the interior space when the cover is in the closed position, and
    an exterior side of the cover includes a plurality of protrusions aligned with the indentations on the interior side of the cover,
    wherein the protrusions of the tray and the indentations of the cover are in register with one another when the cover is in the closed position, and
wherein for each protrusion of at least some protrusions of the plurality of protrusions:
    the indentation that defines the protrusion also defines a cavity
    the protrusion comprises a base end, an end opposite the base end, and a lateral surface extending completely around the cavity, the lateral surface extending from the base end of the protrusion to the opposite end of the protrusion,
    a portion of the susceptor film extends substantially continuously both around the protrusion and from the base end of the protrusion to the opposite end of the protrusion, comprising the lateral surface as a whole being substantially continuously covered by the portion of the susceptor film, so that the portion of the susceptor film extends substantially continuously around the cavity, and
    the portion of the susceptor film comprises both
        a portion of the polymer film and
        a portion of the layer of microwave energy interactive material.

14. The apparatus of claim 13, wherein the layer of microwave energy interactive material has a thickness of from about 60 to about 100 angstroms.

15. The apparatus of claim 13, wherein the protrusions on the interior side of the tray and the protrusions on the exterior side of the cover are substantially frusto-conical or substantially frusto-pyramidal in shape, and the portions of the susceptor film are substantially frusto-conical or substantially frusto-pyramidal in shape.

16. The apparatus of claim 13, wherein the microwave energy interactive material comprises at least one of aluminum and indium tin oxide.

17. The apparatus of claim 13, formed by a method comprising subjecting the susceptor film joined to paperboard to a thermal, mechanical, or thermomechanical pressing technique.

18. The apparatus of claim 13, in combination with a food item, wherein the food item is initially in an uncooked condition.

19. A method of using the combination of claim 18, comprising exposing the uncooked food item within the apparatus to microwave energy, so that the microwave energy interactive material generates heat to cook the uncooked food item.

20. A microwave heating apparatus, comprising:
a first component and a second component joined to one another, the second component being operative for moving relative to the first component between an open position and a closed position, the closed position defining an interior space for receiving a food item, wherein the first component and second component each comprise a susceptor film joined to paperboard, the susceptor film comprising a layer of microwave energy interactive material deposited on a polymer film, wherein the layer of microwave energy interactive material is operative for absorbing microwave energy and converting microwave energy into heat, and wherein the polymer film faces the interior space when the second component is in the closed position, so that the microwave energy interactive material is closely proximate to the interior space for heating the food item, wherein
the first component includes a plurality of projections that extend towards the interior space when the second component is in the closed position,
the second component includes a plurality of indentations that extend away from the interior space when the second component is in the closed position, and
the projections of the first component and the indentations of the second component are aligned with one another when the second component is in the closed position, and
wherein for each projection of at least some projections of the plurality of projections:
the indentation that defines the projection also defines a cavity
the projection comprises a base end, an end opposite the base end, and a lateral surface extending completely around the cavity, the lateral surface extending from the base end of the projection to the opposite end of the projection,
a portion of the susceptor film extends substantially continuously both around the projection and from the base end of the projection to the opposite end of the projection, comprising the lateral surface as a whole being substantially continuously covered by the portion of the susceptor film, so that the portion of the susceptor film extends substantially continuously around the cavity, and
the portion of the susceptor film comprises both
a portion of the polymer film and
a portion of the layer of microwave energy interactive material.

21. The apparatus of claim 20, wherein the projections of the first component and the indentations of the second component are substantially frusto-conical or substantially frusto-pyramidal in shape, and the portions of the susceptor film are substantially frusto-conical or substantially frusto-pyramidal in shape.

22. The apparatus of claim 20, wherein
an exterior side of the first component includes a plurality of indentations that define the projections on the interior side of the first component, and
an exterior side of the second component includes a plurality of projections defined by the indentations on the interior side of the second component.

23. The apparatus of claim 20, wherein the microwave energy interactive material comprises at least one of aluminum and indium tin oxide.

24. The apparatus of claim 20, wherein the layer of microwave energy interactive material has a thickness of from about 60 to about 100 angstroms.

25. The apparatus of claim 20, formed by a method comprising subjecting the susceptor film joined to paperboard to a thermal, mechanical, or thermomechanical pressing technique.

26. The apparatus of claim 20, in combination with the food item, wherein the food item initially has an at least partially liquid consistency.

27. A method of using the combination of claim 26, comprising exposing the food item within the apparatus to microwave energy, so that the microwave energy interactive material generates heat that cooks the food item, wherein the cooked food item has an at least partially solid consistency.

28. A microwave heating apparatus, comprising:
a single piece of a laminate pressed to define a tray and a cover foldably joined to one another along a line of disruption in the laminate so that the cover can be moved between an open position and a closed position, wherein the laminate comprises a susceptor film joined to paperboard, wherein the susceptor film comprises a layer of microwave energy interactive material supported on a polymer film, the microwave energy interactive material being operative for heating in response to microwave energy,
wherein
the tray includes
a base including a plurality of upwardly extending protrusions, and
a plurality of walls extending upwardly from a peripheral margin of the base, wherein the base and walls define an interior space for receiving a food item, and
the cover includes
a substantially planar portion, and
a plurality of protrusions that extend from the substantially planar portion, the protrusions each being circumscribed by and contiguous with the substantially planar portion of the cover, wherein the protrusions of the cover extend into the interior space when the cover is in the closed position,
wherein the substantially planar portion of the cover extends to a peripheral edge of the cover, so that the substantially planar portion of the cover is for being in a facing, contacting relationship with an uppermost portion of the walls of the tray when the cover is in the closed position, and
the indentation that defines the protrusion also defines a cavity
the protrusion comprises a base end, an end opposite the base end, and a lateral surface extending completely around the cavity, the lateral surface extending from the base end of the protrusion to the opposite end of the protrusion,
a portion of the susceptor film extends substantially continuously both around the protrusion and from the base end of the protrusion to the opposite end of the protrusion, comprising the lateral surface as a whole being substantially continuously covered by the portion of the susceptor film, so that the portion of the susceptor film extends substantially continuously around the cavity, and
the portion of the susceptor film comprises both
a portion of the polymer film and
a portion of the layer of microwave energy interactive material.

29. The apparatus of claim 28, wherein:
the protrusions are substantially frusto-conical or substantially frusto-pyramidal in shape;
the portions of the susceptor film are substantially frusto-conical or substantially frusto-pyramidal in shape; and
the layer of microwave energy interactive material has a thickness of from about 60 to about 100 angstroms.

30. The apparatus of claim 1, wherein for each protrusion of at least some protrusions of the plurality of protrusions:
the cavity is concave,
the protrusion is a dome having a surface, and
the lateral surface is the surface of the dome.

31. The apparatus of claim 7, wherein for each protrusion of at least some protrusions of the plurality of protrusions:
the cavity is concave,
the protrusion is a dome having a surface, and
the lateral surface is the surface of the dome.

32. The apparatus of claim 13, wherein for each protrusion of at least some protrusions of the plurality of protrusions:

the cavity is concave,
the protrusion is a dome having a surface, and
the lateral surface is the surface of the dome.

33. The apparatus of claim 20, wherein for each projection of at least some projections of the plurality of projections:
the cavity is concave,
the projection is a dome having a surface, and
the lateral surface is the surface of the dome.

34. The apparatus of claim 28, wherein for each protrusion of at least some protrusions of the plurality of protrusions:
the cavity is concave,
the protrusion is a dome having a surface, and
the lateral surface is the surface of the dome.

\* \* \* \* \*